United States Patent
Bauskar

(10) Patent No.: US 11,383,117 B2
(45) Date of Patent: Jul. 12, 2022

(54) LAYERED, COMPOSITE LENS AND METHOD OF CONSTRUCTION

(71) Applicant: KAPPLER, INC., Guntersville, AL (US)

(72) Inventor: Akshay S. Bauskar, Guntersville, AL (US)

(73) Assignee: KAPPLER, INC., Guntersville, AL (US)

( * ) Notice: Subject to any disclaimer, the term of this patent is extended or adjusted under 35 U.S.C. 154(b) by 0 days.

(21) Appl. No.: 16/499,829

(22) PCT Filed: Apr. 2, 2018

(86) PCT No.: PCT/US2018/025767
§ 371 (c)(1),
(2) Date: Sep. 30, 2019

(87) PCT Pub. No.: WO2018/184030
PCT Pub. Date: Oct. 4, 2018

(65) Prior Publication Data
US 2020/0101341 A1    Apr. 2, 2020

Related U.S. Application Data

(60) Provisional application No. 62/479,949, filed on Mar. 31, 2017.

(51) Int. Cl.
*A62D 7/02*    (2006.01)
*A41D 31/02*   (2019.01)
(Continued)

(52) U.S. Cl.
CPC .............. *A62D 7/02* (2013.01); *A41D 31/02* (2013.01); *A42B 1/0181* (2021.01); *A42B 3/225* (2013.01);
(Continued)

(58) Field of Classification Search
CPC ...... A62D 7/02; A41D 13/1184; A41D 31/02; A61F 9/045; A62B 18/082; A42B 1/0181;
(Continued)

(56) References Cited

U.S. PATENT DOCUMENTS 5,494,720 A    2/1996 Smith et al.
6,364,980 B1   4/2002 Smith et al.
(Continued)

FOREIGN PATENT DOCUMENTS

CN    1774332 A    5/2006
CN    1886256 A    12/2006
(Continued)

OTHER PUBLICATIONS

International Search Report issued for corresponding International Patent Application No. PCT/US2018/025767 dated Jun. 4, 2018.
(Continued)

*Primary Examiner* — Catherine A. Simone
(74) *Attorney, Agent, or Firm* — Moore & Van Allen PLLC; Henry B. Ward, III

(57) ABSTRACT

A protective lens is provided having a first layer, a second layer and a third layer. The first, second and third layers each comprises a first surface and a second surface. The first layer comprises a substantially non-reactive material. The first surface of the second layer is positioned adjacent to the second surface of the first layer. The second layer comprises a substantially fire resistant material. The first surface of the third layer is positioned adjacent to the second surface of the second layer. The third layer comprises a substantially hydrophobic material.

33 Claims, 5 Drawing Sheets

(51) Int. Cl.

| | |
|---|---|
| *A62B 18/08* | (2006.01) |
| *A42B 1/0181* | (2021.01) |
| *A42B 3/22* | (2006.01) |
| *B32B 27/32* | (2006.01) |
| *B32B 7/09* | (2019.01) |
| *B32B 27/36* | (2006.01) |
| *B32B 27/30* | (2006.01) |
| *B32B 3/04* | (2006.01) |
| *B32B 7/04* | (2019.01) |
| *B32B 7/022* | (2019.01) |
| *B32B 3/06* | (2006.01) |

(52) U.S. Cl.
CPC .............. *A62B 18/082* (2013.01); *B32B 3/04* (2013.01); *B32B 3/06* (2013.01); *B32B 7/022* (2019.01); *B32B 7/04* (2013.01); *B32B 7/09* (2019.01); *B32B 27/304* (2013.01); *B32B 27/322* (2013.01); *B32B 27/36* (2013.01); *B32B 2307/3065* (2013.01); *B32B 2307/546* (2013.01); *B32B 2307/714* (2013.01); *B32B 2307/73* (2013.01); *B32B 2571/00* (2013.01)

(58) Field of Classification Search
CPC .. A42B 3/225; A42B 3/22; A42B 3/24; A42B 3/26; A42B 3/221; A42B 3/228; B32B 3/04; B32B 3/06; B32B 7/022; B32B 7/04; B32B 7/09; B32B 27/304; B32B 27/322; B32B 27/36; B32B 2307/3065; B32B 2307/546; B32B 2307/714; B32B 2307/73; B32B 2571/00; B32B 2551/00
USPC ........................................................ 428/421
See application file for complete search history.

(56) References Cited

U.S. PATENT DOCUMENTS

| | | | |
|---|---|---|---|
| 7,434,272 | B2 | 10/2008 | Hannon et al. |
| 2001/0051481 | A1 | 12/2001 | Carroll |
| 2005/0193472 | A1* | 9/2005 | Courtney ............... A62B 17/04 2/202 |
| 2009/0007402 | A1 | 1/2009 | Carroll et al. |
| 2014/0111977 | A1 | 4/2014 | Nyberg |
| 2014/0223648 | A1 | 8/2014 | Munter |
| 2014/0377566 | A1* | 12/2014 | Majumdar ......... G02B 27/0006 428/424.6 |

FOREIGN PATENT DOCUMENTS

| | | |
|---|---|---|
| CN | 1968870 A | 5/2007 |
| CN | 101687396 A | 3/2010 |
| CN | 101959683 A | 1/2011 |
| CN | 103909710 A | 7/2014 |
| WO | 0007671 A1 | 2/2000 |
| WO | 2017/015756 A1 | 2/2017 |
| WO | 2018184030 A1 | 10/2018 |

OTHER PUBLICATIONS

Written Opinion of The International Searching Authority issued for corresponding International Patent Application No. PCT/US2018/025767 dated Jun. 4, 2018.

Chinese Office Action Issued by the Chinese Patent Office for Patent Application No. 201880027802.8 dated Aug. 26, 2020.

"Practical Plastics Handbook" written by Luo, Hesheng Modern Press, published on Apr. 30, 1987, pp. 127-128.

Extended European Search Report issued by the European Patent Office for European Application No. 18776076.4, dated Apr. 29, 2021.

Second Office Action issued by the Chinese Patent Office for Chinese Patent Application No. 201880027802.8, dated Jul. 5, 2021.

Partial Supplementary European Search Report Issued by the European Patent Office for European Patent Application No. 18776076.4, dated Dec. 8, 2021.

Third Office Action issued by the Chinese Patent Office for Chinese Patent Application No. 201880027802.8, dated Mar. 24, 2022, requesting deletion of the term "substantially" and clarification of the term "non-reactive" in the claims. No prior art rejections are set forth in the Third Office Action.

\* cited by examiner

LAYERED, COMPOSITE LENS AND METHOD OF CONSTRUCTION

CROSS-REFERENCE TO RELATED APPLICATIONS

This application is a non-provisional filing of U.S. Provisional Application No. 62/479,949 filed Mar. 31, 2017, the contents of which are hereby incorporated by reference herein.

FIELD OF THE INVENTION

The present invention relates to a layered, anti-fog composite system and method for constructing the same for use in personal protective equipment.

BACKGROUND OF THE INVENTION

Personal protective equipment of the type used to protect users from exposure to hazardous materials or environments typically includes a protective lens that allows the user to see out of the protective equipment into an exterior environment or space. Due to the conditions of the environments and situations in which such personal protective equipment is often used, the protective lenses water may condense on the lens surface causing the lens to "fog up" and obstruct the vision of a user. For example, the protective equipment may be used in a hot or humid environment or a lens may be located in close proximity to breath of a user, both of which may lead to fogging of a lens.

To prevent water from condensing on the protective lens, which can obstruct the ability of the user to see through lens. Existing anti-fog lens technologies typically employ coatings and films to apply an anti-fogging material to the exterior of a protective lens. While coatings may be applied through methods such as spraying or dipping before being cured, anti-fog films are typically rolled onto a substrate with an adhesive. Adhesives may also be employed to attach a lens to a suit or other form of personal protective equipment to create a seal. However, in high temperature or high humidity environments and situations, adhesives may degrade and fail potentially exposing the user to hazardous conditions. Accordingly there exists a need for an anti-fog protective lens and construction for coupling or mating the lens to the protective equipment that can meet the challenges of these hazardous environments while maintaining the integrity of the protective equipment, including the protective lens.

BRIEF SUMMARY OF THE INVENTION

The following presents a summary of one or more embodiments of the invention in order to provide a basic understanding of such embodiments. This summary is not an extensive overview of all contemplated embodiments, and is not intended to identify key or critical elements of all embodiments or delineate the scope of any or all embodiments. The sole purpose of the brief summary is to present some concepts of one or more embodiments in a summary form as a prelude to the more detailed description that is presented later.

A protective lens is provided having a first layer, a second layer and a third layer. The first, second and third layers each comprises a first surface and a second surface. The first layer comprises a substantially non-reactive material. In one embodiment, the substantially non-reactive material of the first layer comprises a fluorinated polymer. In another embodiment, the fluorinated polymer is fluorinated ethylene propylene. The first surface of the second layer is positioned adjacent to the second surface of the first layer. The second layer comprises a substantially fire resistant material. In yet another embodiment, the second layer is substantially fire retardant. In yet another embodiment, the fire resistant material of the second layer comprises a chlorinated polymer. In yet another embodiment, the chlorinated polymer comprises polyvinylchloride. The first surface of the third layer is positioned adjacent to the second surface of the second layer. The third layer comprises a substantially hydrophobic material. In yet another embodiment, the substantially hydrophobic material of the third layer comprises polyethylene terephthalate. In yet another embodiment, the third layer comprises a film. In yet another embodiment, the third layer comprises a coating.

In yet another embodiment, the surface area of the second surface of the first layer is greater than the surface area of at least one of the first surface of the second layer and the first surface of the third layer so that the first layer comprises an extension portion around at least a portion of the perimeter of the at least one of the second layer and the third layer. In another embodiment, the flexural rigidity of one of the first layer, the second layer, and the third layer is higher compared to the flexural rigidity of the other two layers. In yet another embodiment, the flexural rigidity of the second layer is higher compared to the flexural rigidity of the other two layers. In yet another embodiment, two or more of the first layer, the second layer, and the third layer are coupled together without an adhesive. In yet another embodiment, the second layer and the third layer are stitched together.

A protective article is also provided comprising a garment and a protective lens, the protective lens comprising a first layer, a second layer, and a third layer. The garment comprises a first and second surface and defines an aperture having a perimeter. The first, second, and third layers each comprises a first surface and a second surface. The first layer comprises a substantially non-reactive material. The first surface of the second layer is positioned adjacent to the second surface of the first layer. The second layer comprises a substantially fire resistant material. The first surface of the third layer is positioned adjacent to the second surface of the second layer. The third layer comprises a substantially hydrophobic material. The first, second and third layers are coupled together and to the garment about the perimeter of the garment.

In one embodiment, a first interfacial layer is positioned on at least a portion of the first surface of the second layer, and at least one stitch is positioned to extend through the first interfacial layer and the second layer. In another embodiment, a second interfacial layer is positioned on at least a portion of the second surface of the third layer, and at least one stitch is positioned to extend through the first interfacial layer, the second layer, the third layer, and the second interfacial layer. In yet another embodiment, a first seam tape is positioned to overlap an edge of the first surface of the first layer and the first surface of the garment about the perimeter of the aperture of the garment, and a second seam tape is positioned to overlap an edge of the second surface of the third layer and the second surface of the garment about the perimeter of the aperture of the garment, wherein the first seam tape and the second seam tape are configured to at least partially couple the protective lens to the garment.

A method of constructing a protective article is also provided. The method comprises providing a first layer, a second layer, and a third layer. The method further comprises providing a garment having an aperture that defines a perimeter. The first, second and third layers each comprises a first surface and a second surface. The first layer comprises a substantially non-reactive material. The first surface of the second layer is positioned adjacent to the second surface of the first layer. The second layer comprises a substantially fire resistant material. The first surface of the third layer is positioned adjacent to the second surface of the second layer. The third layer comprises a substantially hydrophobic material. The method further comprises coupling the first, second and third layers together and to the garment about the perimeter of the garment.

In one embodiment, the coupling step comprises providing and positioning a first interfacial layer on at least a portion of the first surface of the second layer and stitching through the first interfacial layer and the second layer with at least one stitch. In yet another embodiment, the coupling step comprises providing and positioning a second interfacial layer on at least a portion of the second surface of the third layer and stitching through the first interfacial layer, the second layer, the third layer, and the second interfacial layer with at least one stitch. In yet another embodiment, the coupling step comprises providing a first seam tape and a second seam tape, securing the first seam tape to the first layer and the garment by overlapping an edge of the first surface of the first layer and the first surface of the garment about the perimeter of the aperture of the garment, and securing the second seam tape to the third layer and the garment by overlapping an edge of the second surface of the third layer and the second surface of the garment about the perimeter of the aperture of the garment.

BRIEF DESCRIPTION OF THE DRAWINGS

Figures 1A, 1B:
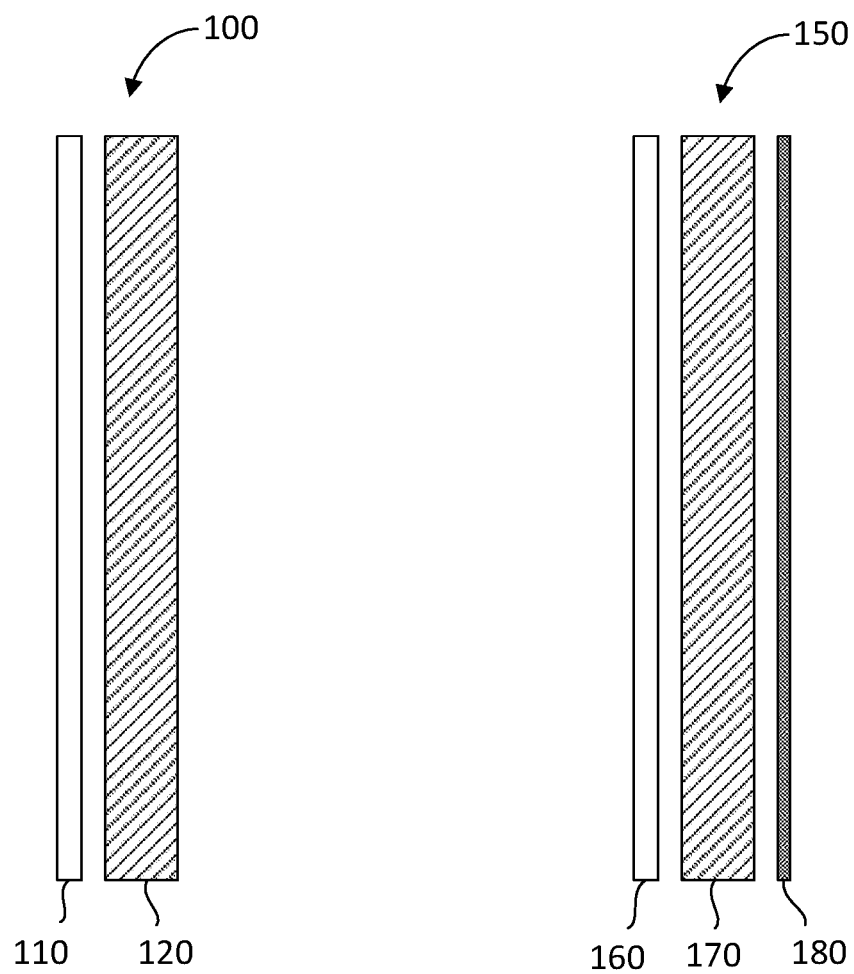
Figure 2A:
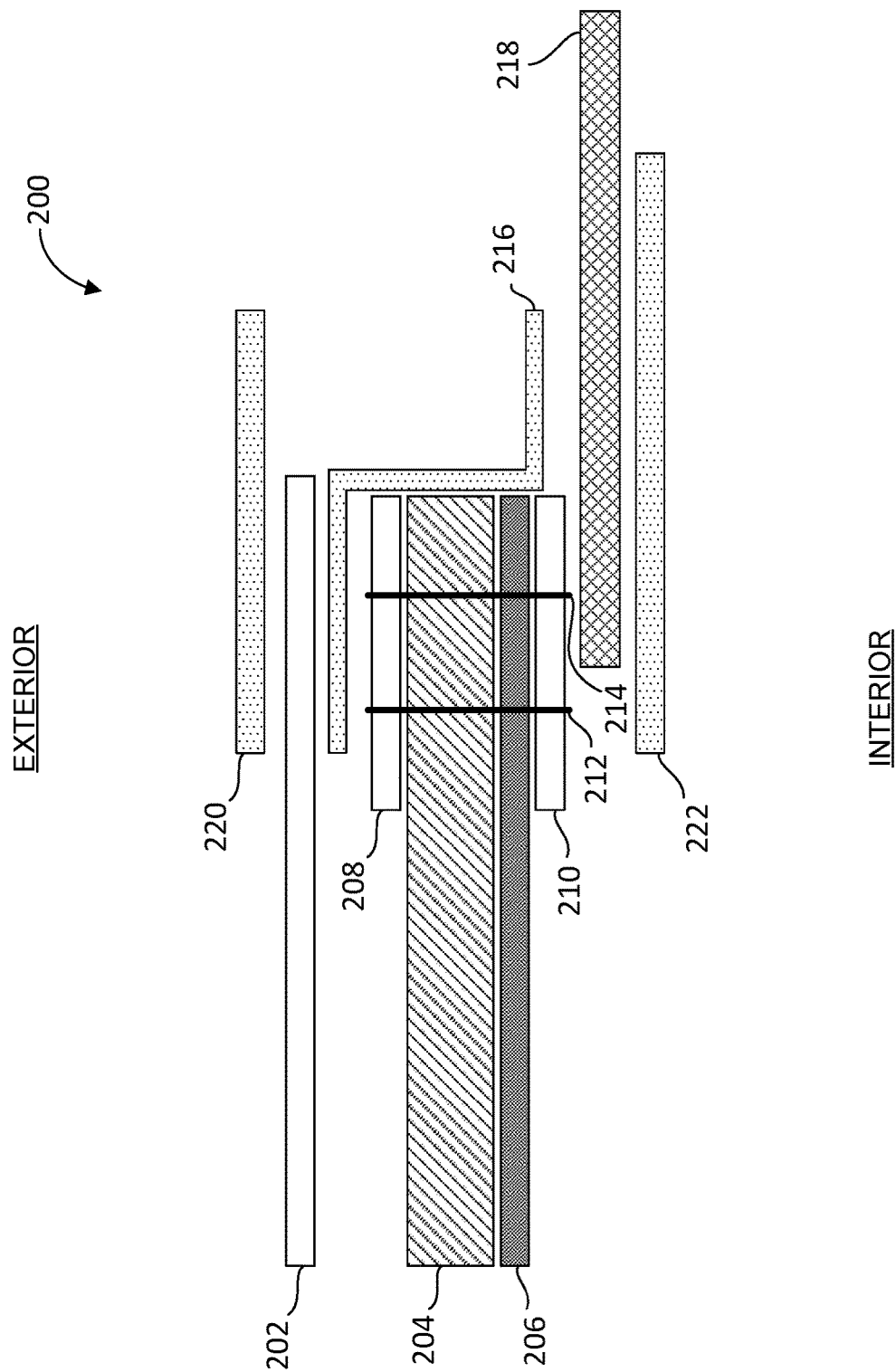
Figure 2B:
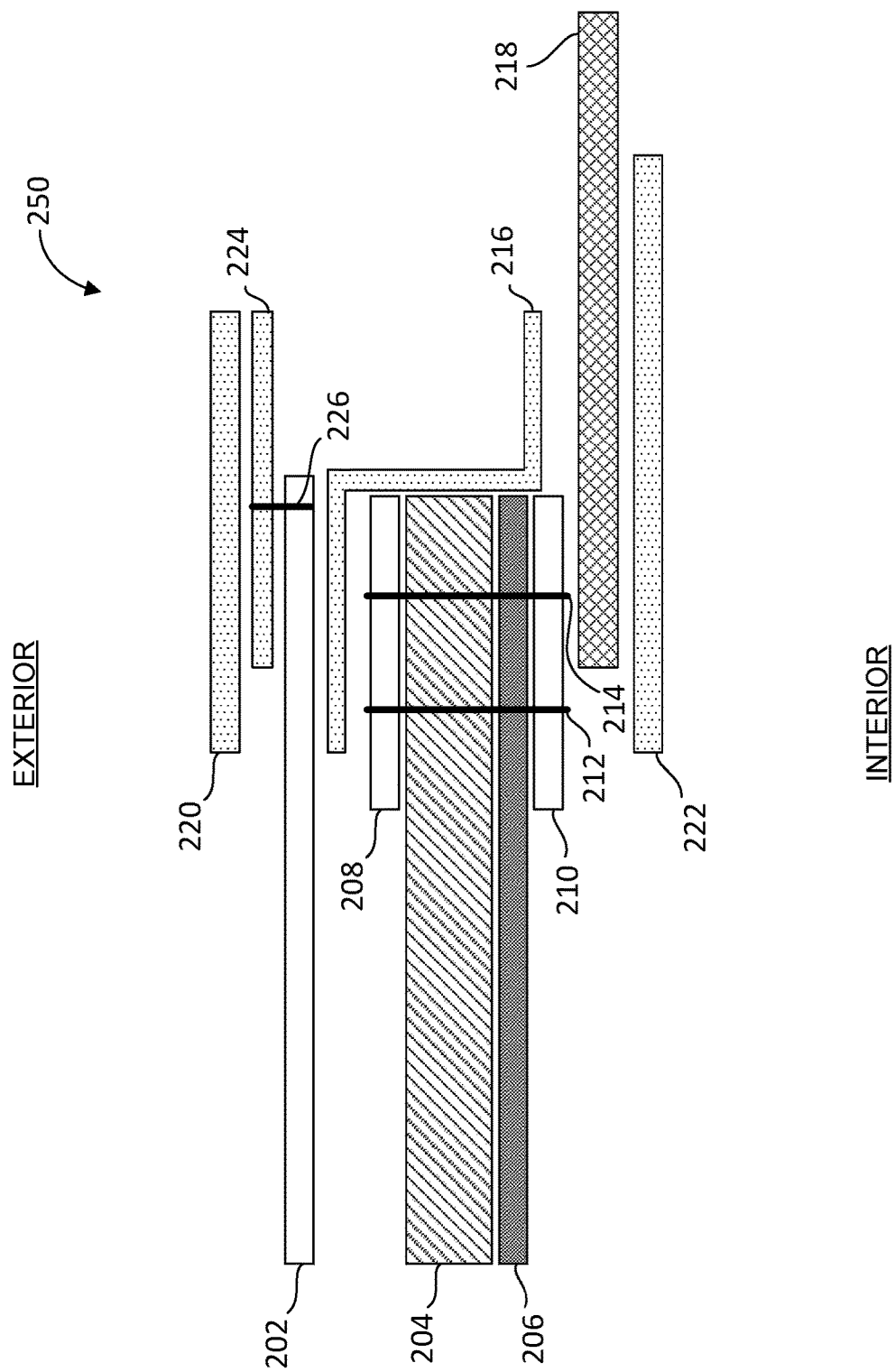
Figure 3A:
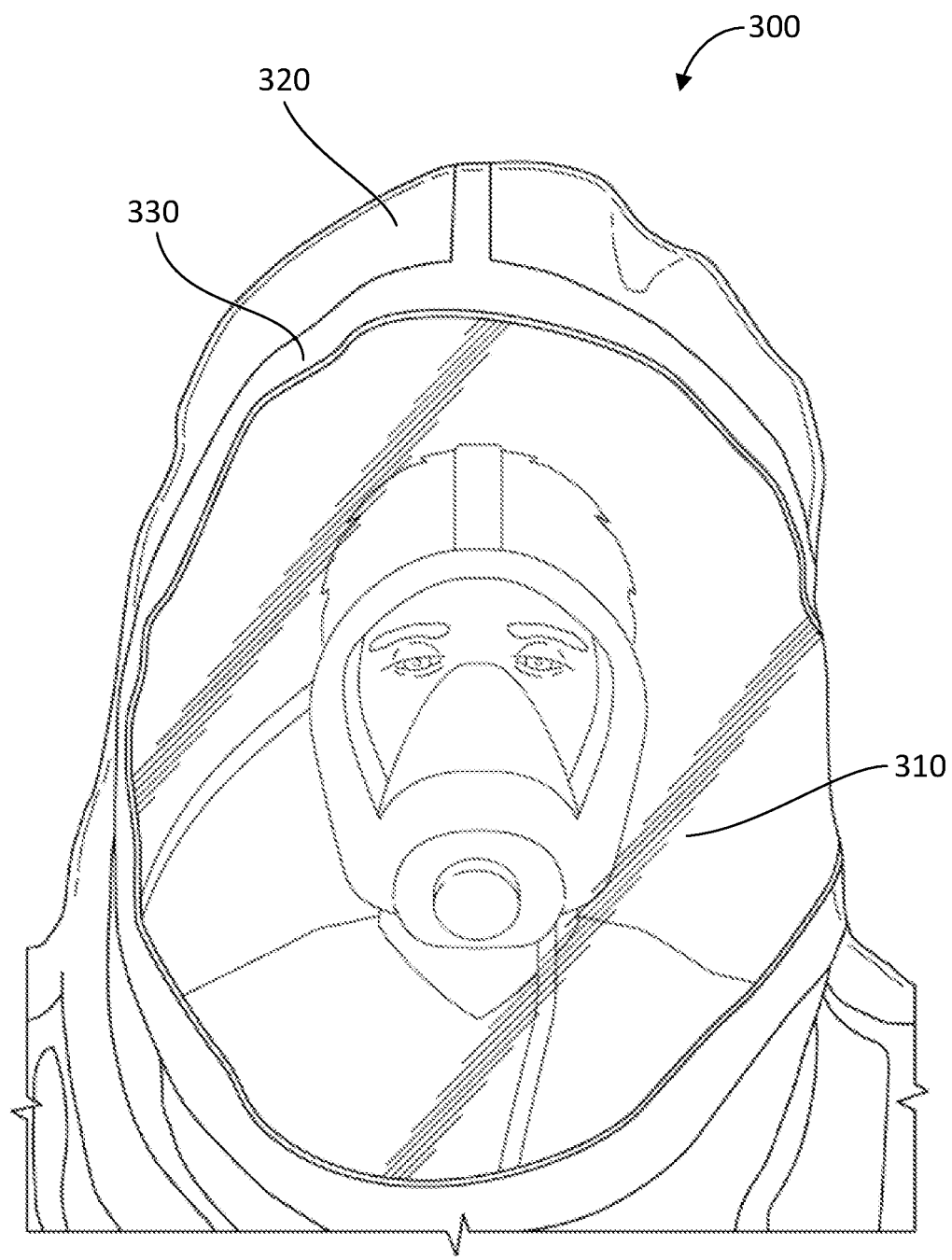
Figure 3B:

Having thus described embodiments of the invention in general terms, reference will now be made to the accompanying drawings, wherein:

FIG. 1A provides a schematic diagram depicting a cross section of a protective lens 100, in accordance with one embodiment of the invention;

FIG. 1B provides a schematic diagram depicting a cross section of a protective anti-fog lens system 150, in accordance with another embodiment of the present invention;

FIG. 2A provides a schematic diagram depicting a cross sectional of an assembled protective lens 200 incorporated into a personal protection equipment system, in accordance with one embodiment of the present invention;

FIG. 2B provides a schematic diagram depicting a cross sectional view of an assembled protective lens incorporated into a personal protection equipment system 250, in accordance with one embodiment of the present invention;

FIG. 3A provides a detailed view of a portion of an assembled protective lens incorporated into a personal protective equipment system 300, in accordance with one embodiment of the invention; and FIG. 3B provides a front views of an assembled protective lens incorporated into a personal protective equipment system 300, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the drawings, like reference characters and numbers refer to like elements throughout. Also, the drawings are not necessarily to scale, emphasis instead generally being placed upon illustrating the principles of the disclosure. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention are directed to a layered, composite lens for preventing the condensation of water (i.e., fog) on at least the interior surface of the lens in a hot and/or humid environment. The lens of the present invention is structured to be integrated into personal protective equipment so as to maintain the integrity of an air-tight, protective barrier between a hazardous environment and a user of the PPE. The lens of the present invention comprises a unique, air-tight seal with the PPE capable of resisting, either temporarily or completely, degradation typically experienced by conventional lens in hazardous environments. In some embodiments, the layered, composite lens may be transparent, semitransparent, or translucent lens to allow varying amounts of light to pass through so that a user may at least partially see through the lens while still receiving protection from the hazardous environment.

It should be understood that "coupled," as used herein, means that the components may be formed integrally with each other, or may be formed separately and coupled together using an adhesive, adhesive tape (such as seam tape), mechanically securing (such as by stitching) or a combination of any of the foregoing. Furthermore, "coupled" means that the components may be formed directly to each other, or to each other with one or more components located between the components that are coupled together. Furthermore, "coupled" may mean that the components are detachable from each other, or that they are permanently coupled together. Furthermore, "coupled" may further refer to one or more components or materials that may be bonded, either chemically or mechanically, to one another.

A "user," as used herein refers to a beneficiary of the protective qualities of the PPE, including the layered, composite lens. In some embodiments, a user may be an operator or wearer of personal protective equipment that at least incorporates the layered, composite lens in the construction or design of the equipment.

The term "composite," as used herein refers to an article comprising multiple rigid, semi-flexible, or flexible layers or substrates or a combination of layers or substrates of the same or differing flexural rigidities.

As used herein, an "inner" surface or object refers to a surface or object facing towards or on the inside of an item of personal protective equipment such as a lens or suit itself, in which the inside of the personal protective equipment houses the user benefitting from the protective qualities of the personal protective equipment. Additionally, and inner side may also be referred to as a user side. Similarly, an "outer" surface or object refers to a surface or objecting facing away or on the outside of an item of personal protective equipment.

The terms "personal protective equipment" and "PPE," as used herein, may be used interchangeably and refers to a barrier used to minimize exposure to hazards or potential hazards that may cause injury or illness. Personal protective equipment may protect a user from biological, chemical, physical, radiological, electrical, thermal and/or mechanical hazards in hazardous environments (e.g., a laboratory, a hospital, a manufacturing plant or chemical or petroleum refinery, a burning building, a warzone, or the like) by providing a protective barrier, between the user and the hazardous environment. PPE comprises a "garment" which may include a hood for the user's head only, a hood with an apron or vest for the user's head and upper body or a full body suit for all or substantially all of the user's entire body. PPE garments may further comprise, for example, gloves or shoes (i.e., booties), which can be separate or formed integrally with the rest of the garment.

As used herein, the term "flame resistant" is defined in NFPA 2112 "Standard on Flame-Resistant Garments for Protection of Industrial Personnel against Flash Fire" as a property of a material whereby combustion is prevented, terminated, or inhibited following the application of a flaming or nonflaming source of ignition, with or without subsequent removal of the ignition source. Flame resistance may be an inherent quality of an article, material, or chemical sub stance.

The terms "flame retardant" and "FR," as used herein, may be used interchangeably and refers to the characteristic or ability of preventing or inhibiting the ignition and/or propagation of fire to prevent or reduce damage or degradation of an article or material. An article or material may be treated with a flame retardant substance or additive, such as in the form of a coating, film, or the like, to provide the article or material with FR qualities. Flame retardant substances typically comprise, but are not limited to, organic or inorganic chemical compounds comprising bromine, phosphorus, nitrogen, and/or chlorine.

FIG. 1A provides a schematic diagram depicting a cross section of a protective lens 100, in accordance with one embodiment of the invention. In some embodiments, the protective lens 100 is a composite system comprising one or more layers assembled proximate or nearly-proximate to one another, wherein the layers may be a plurality of sheets of a material, coatings, films, or the like. In the illustrated embodiment, the protective lens 100 comprises a first layer 110 and a second layer 120. In some embodiments, at least some of the layers of the protective lens 100 may be optically transparent, semitransparent, or translucent to allow varying amounts of light to pass through the lens 100 so that a user of the protective lens 100 can see through the lens while simultaneously benefitting from one or more protective qualities of the lens 100.

The first layer 110 is positioned such that a first surface of the first layer is on the outside of the protective lens 100. The first layer 110 is substantially chemically resistant or non-reactive when brought into contact with potentially hazardous substances or environments (e.g., chemicals, acids, bases, solvents, biological substances, or other reactive materials), wherein the original structure and/or composition of the first layer 110 comprises a substantially stable or inert material that does not readily decompose or degrade even in the presences of such hazardous substances or environments. The first layer 110 may further be resistant to abrasion or puncture. The first layer 110 may further be resistant to or capable of withstanding flame, radiation, biological materials, extreme thermal conditions, and/or the like for certain predetermined periods of time depending on the level of the hazard.

In some embodiments, the first layer 110 may comprise a polymer or copolymer comprising fluorine. In one embodiment, the first layer 110 comprises fluorinated ethylene propylene (FEP) polymer in the form of a film, coating, sheet or the like, wherein the FEP-comprising first layer 110 is substantially chemically resistant. In some embodiments, the first layer 110 has a thickness of approximately 5 mm. In other embodiments, the thickness of the first layer 110 is greater than 5 mm. In yet other embodiments, the thickness of the first layer 110 is less than 5 mm.

The second layer 120 has a first surface and second surface. The first surface of the second layer 120 is positioned proximate to the first surface of the first layer 110, wherein the first layer 110 is coupled to the second layer 120. In some embodiments, the second layer 120 has properties similar to that of the first layer 110, such as being substantially chemically resistant or non-reactive when brought into contact with potentially hazardous substances or environments (e.g., chemicals, acids, bases, solvents, biological substances, or other reactive materials), resistant to abrasion or puncture, and/or resistant to or capable of withstanding flame, radiation, biological materials, extreme thermal conditions, and/or the like for certain predetermined periods of time depending on the level of the hazard. In other embodiments, the second layer 120 may have properties that are different than those of the first layer 110. For example, the first layer 110 may comprise a first material having first protective properties, such as chemical resistance, and the second layer 120 may comprise a second material having second protective properties, such as flame resistance and/or flame retardancy.

In some embodiments, the second layer 120 comprises a polymer or copolymer comprising chlorine. In one embodiment, the second layer 120 comprises a polyvinylchloride (PVC) polymer in the form of film, coating, sheet, or the like, wherein the PVC-comprising second layer 120 is substantially flame resistant and/or flame retardant. In some embodiments, the second layer 120 has a thickness of approximately 40 mm. In other embodiments, the thickness of the second layer 120 is greater than 40 mm. In yet other embodiments, the thickness of the second layer 120 is less than 40 mm.

FIG. 1B provides a schematic diagram depicting a cross section of a protective lens 150, in accordance with one embodiment of the present invention. The lens 150 comprises a first layer 160 and a second layer 170 similar to the first layer 110 and the second layer 120 of the protective lens 100 of FIG. 1A, respectively, as previously described herein. The lens 150 of FIG. 1B further comprises a third layer 180 having first and second surfaces. The third layer 180 is positioned proximate the second layer 170 such that the first surface of the third layer 180 is adjacent the second surface of the second layer 170. The third layer 180 is coupled to the second layer 170.

The third layer 180 may comprise a material that prevents the accumulation of liquid or vaporized water (i.e., condensation or "fogging") on the surface of the third layer 180. In some embodiments, third layer 180 may prevent accumulation of fog by providing energetically unfavorable surface conditions for wetting of the surface by water or another liquid, wherein water or another liquid may not substantially adhere to the third layer 180. In some embodiments, the third layer 180 comprises a material that prevents condensation or fogging inherently. In other embodiments, an anti-fog film, coating, or the like is applied to a surface of the protective lens 100 to prevent fog accumulation. In some embodiments, the anti-fog film, coating, or the like may be applied to an interior surface of the protective lens 100. In some embodiments, the third layer 180 may comprise a third material having third protective properties such as an antifogging property. By layering the third layer 180 with the first layer 160 and the second layer 170 having similar properties as layers 110 and 120, respectively, of the embodiment shown and disclosed above with respect to FIG. 1A, the protective lens 150 benefits from the protective properties of the first layer 160 and the second layer 170 while also benefiting from the anti-fogging property of the third layer 180.

In some embodiments, the third layer 180 comprises a substantially hydrophobic polymer or copolymer. In one embodiment, the third layer 180 comprises a polyethylene terephthalate (PET) polymer in the form of a film, coating, sheet, or the like. In some embodiments, the third layer 180 has a thickness of approximately 2 mm. In other embodiments, the thickness of the third layer 180 is greater than 2 mm. In yet other embodiments, the thickness of the third layer 180 is less than 2 mm.

The first 160, second 170, and third 180 layers may comprise rigid, semi-flexible, or flexible materials. In a specific embodiment, the first layer 160 and the third layer 180 may comprise flexible or semi-flexible materials, and the second layer 170 may comprise a substantially rigid material, wherein the substantially rigid second layer 170 may provide at least partial structural support to the protective lens 150. In other embodiments, the flexural rigidity of one of the first layer, the second layer, and the third layer is higher compared to the flexural rigidity compared to the other two layers. In one embodiment, the flexural rigidity of the second layer is higher compared to the flexural rigidity of the other two layers. In other embodiments, the second layer 170 may comprise flexible or semi-flexible materials, and the first layer 160 and/or the third layer 180 may comprise a substantially rigid material. In another embodiment, the first 160, second 170, and third 180 layers may all be flexible or semi-flexible, wherein an additional layer may be incorporated into the layered composite to at least partially provide structure to the protective lens 150.

In some embodiments, the first layer 160, the second layer 170, and the third layer 180 may be shaped or configured wherein one or more surfaces of the layers 160, 170, 180 have the same area, circumference, and/or diameter. In other embodiments, the first layer 160, the second layer 170, and the third layer 180, may not have the same area, circumference, and/or diameter. In one embodiment, the surface area of the second surface of the first layer 160 is greater than the surface area of at least one of the first surface of the second layer 170 and the first surface of the third layer 180 so that the first layer 160 comprises an extension portion around at least a portion of the perimeter of the at least one of the second layer 170 and the third layer 180. More specifically, the extension portion of the first layer 160 creates a seal around the at least one of the second layer 170 and/or the third layer 180, thereby at least partially encapsulating the second layer 170 when forming the seal between the lens 150 and the garment, as described below. Through encapsulation of the second layer 170 and/or the third layer 180 by the first layer 160, the first layer 160 and the second layer 170 and/or the third layer 180 may be further coupled together without the use of an adhesive.

FIG. 2A provides a schematic diagram depicting a cross sectional of an assembled protective lens 200 incorporated into an aperture provided in a garment comprising personal protection equipment, in accordance with one embodiment of the present invention. For example, the lens may be coupled to an aperture of a PPE suit (as illustrated in FIGS. 3A and 3B) and provide the user positioned within the suit a portal for viewing an environment exterior of the suit while simultaneously benefiting from the protective qualities of both the suit and the lens. Furthermore, a surface of the lens positioned on the inside of the suit prevents the accumulation of condensation or fog on the surface of the lens. The accumulation of condensation or fog may occur in hot or humid environments or due to the breath of the user being directed against the protective lens, which can occur because the protective lens is typically positioned proximate the face of the user. Unlike other typical anti-fog systems, the present invention does not use adhesive to adhere the layers of the layered, composite lens 200 together. This quality is especially important, as under elevated or extreme thermal conditions, in which the present invention may be used, adhesives may become mobile, degrade, or fail which can result in the user being exposed to a hazardous environment.

As depicted in FIG. 2A, the protective lens 200 comprises a first layer 202, a second layer 204, and a third layer 206 that are the same as the first layer 160, the second layer 170, and the third layer 180 of FIG. 1B as previously discussed herein. The first layer 202, the second layer 204, and the third layer 206 may be at least partially joined mechanically using stitches 212 and 214. The stitches 212 and 214 allow for two or more layers of the protective lens 200 to be coupled, at least partially, without the use of adhesive. At least a portion of the stitches 212 and 214 may partially protrude from a surface of a stitched layer in which the stitches 212, 214 are implanted. Stitches 212 and 214 may comprise a natural or synthetic fiber, yarn, polymer or the like. In some embodiments, the stitches 212 and 214 may comprise a material that possesses resistant properties (i.e., abrasion, chemical, thermal, biological, radiological, or the like) as previously described herein for first and second layers. Alternatively, stitches 212 and 214 may comprise other mechanical bonding methods or means such as staples, rivets, or the like.

The protective lens 200 is coupled to the first surface and second surface of the garment 218 about the perimeter of the aperture defined by the garment. In one embodiment, the first surface of the garment is the outer surface and the second surface is the inner surface. The garment 218 may comprise a natural or synthetic material that may be woven, nonwoven, or produced from a similar fabric production technique known in the art. In some embodiments, the garment 218 may comprise a composite material comprising one or more layered materials or a mixture of multiple fabrics, yarns, fibers, or the like. In some embodiments, the garment 218 may further comprise a coating, additive, or the like. In some embodiments, the garment 218 may possess resistant properties (i.e., abrasive, chemical, thermal, radiological, or the like) as previously described herein for the first and second layers of the lens. In some embodiments, the garment 218 is a fabric of PPE apparel such as a full body suit (as illustrated in FIGS. 3A and 3B), wherein the PPE may comprise an opening or aperture in the garment 218 of the PPE over which the protective lens 200 may be positioned. The protective lens 200 may comprise a circumference or area that may be larger than the circumference or area of the aperture of the PPE to allow for at least a partial overlap of the protective lens 200 over an outer surface of an edge of the garment 218 forming the aperture and to allow for the coupling of the protective lens 200 to the portion of garment 218 overlapped by the lens 200, thereby creating a seal. For example, in one embodiment of the invention, the first surface and second surfaces of the garment 218 may comprise a polymer or copolymer comprising fluorine, such as FEP. The protective lens 200 may extend beyond an edge of the perimeter of the aperture defined by the edge of the garment 218 (as shown in FIG. 2A) allowing for the lens 200 to at least partially overlap an outer surface of the edge of the aperture in the garment 218 and allow for coupling of the protective lens 200 to the garment 218.

In some embodiments of the invention, the protective lens 200 may be coupled to an outer surface of the garment 218 using a first seam tape or an outer seam tape 220. The outer seam tape 220 may be at least partially positioned on an outer surface of the garment 218 and at least partially extend over the edge of the protective lens 200 (i.e., the first layer) to also couple the outer surface of the garment 218 to the protective lens 200. Similarly, at least a portion of the protective lens 200 may be coupled to an inner surface of the garment 218 using a second seam tape or an inner seam tape 222. The inner seam tape 222 may be at least partially positioned on an inner surface of the garment 218 and at least partially extend over the edge of garment 218 to operatively couple the garment 218 and an inner surface of the protective lens 200 (i.e., the third layer).

The inner seam tape 222 and the outer seam tape 220 may be further positioned to cover and protect stitches 212 and 214. In this way, a protruding portion of the stitches 212, 214 extending from a surface of a stitched layer may be protected from abrasion and other external stimuli which may lead to degradation and failure of the stitches 212, 214. The outer and inner seam tapes 220, 222 may also cover and smooth over one or more rough edges of the layers of the protective lens. In some embodiments, the seam tape 220, 222 comprises the same material as the garment 218. In other embodiments, the seam tape 220, 222 comprises a material different than that of the garment 218. In some embodiments, the seam tape may possess resistant or protective properties as discussed herein for the first and second layers of the lens. In a specific embodiment, the seam tape, such as seam tapes 220 and 222 may comprise a polymer or copolymer comprising fluorine, such as FEP. In another embodiment, the seam tapes as described herein may comprise a transparent, semitransparent, or translucent FEP tape.

As one or more layers of the protective lens 200 may comprise chlorinated materials (e.g., PVC), an interfacial material may be incorporated into or between the layers of the protective lens 200 to promote coupling of the chlorinated materials and olefin-based compounds. The interfacial material may be configured to provide a platform or bonding interface between one or more layers of the system that typically do not interact or adhere to one another. By acting as an intermediary to which the layers may adhere, the interfacial material allows the layers to be joined to one another. A first interfacial layer 208 may be positioned between the first layer 202 and the second layer 204, while a second interfacial layer 210 may be positioned between the third layer 206 and the garment 218. In one example, inner seam tape 222 may couple to an inner surface of the lens (i.e., the second surface of the third layer) at the second interfacial layer 210. In some embodiments, stitches 212 and 214 may further pass through the first interfacial layer 208 and the second interfacial layer 210. In some embodiments, the interfacial layers 208, 210 comprise a chlorinated polyethylene (CPE) cloth, film, coating, sheet, or the like. The incorporated interfacial layers 208, 210 provide a base or platform whereon the seam tapes 220, 222 may couple with and attach to the protective lens 200.

In some embodiments, an intermediate seam tape 216 may optionally be positioned at least partially between the first layer 202 and the first interfacial layer 208 to strengthen the coupling of the lens to the garment 218. The intermediate seam tape 216 may be positioned on an outer surface of the first interfacial layer 208 and extend over the edge of the first interfacial layer 208 to further couple to an outer surface of the garment 218. The tape 216 may further cover and protect the stitches 212 and 214 while also covering and smoothing over the rough edges of the layers of the lens. With the incorporation of the intermediate seam tape 216, the outer seam tape 220 may couple to an outer surface of the intermediate seam tape 216 and/or the outer surface of the garment 218 when used to couple the protective lens 200 to the garment 218.

Once applied to the assembly of the protective lens 200, the seam tapes 216, 220, 222 may be heat sealed, thermally fused, and/or pressure fused without the use of adhesive between layers of the assembly. The process of thermal or pressure fusing may vary depending on the materials used for the seam tapes and the garment 218, and may be selected to provide adhesion without damaging of the layers involved. In this way, an air-tight, protective seal may be formed between the protective lens 200 and the garment 218. In a specific embodiment of the invention, seams of the protective lens 200 may be heat sealed within a temperature range of 560° F.-610° F. In other embodiments, the tape and seam of the protective lens 200 may be sealed ultrasonically.

FIG. 2B provides a schematic diagram depicting a cross sectional view of an assembled protective lens 250 incorporated into a garment 218, in accordance with another embodiment of the present invention. As illustrated in FIG. 2B, an alternative embodiment of the invention may further comprise an additional seam tape 224 positioned between the first layer 160 and the outer seam tape 220. The additional seam tape 224 may be used to further couple one or more layers of the protective lens 250 to one another. In some embodiments, additional seam tape 224 may provide a surface or platform on which outer seam tape 220 may couple. The illustrated embodiment may further comprise additional stitches 226 extending through the additional seam tap 224 and the first layer 160. The additional stitches 226 may further mechanically couple the additional seam tape 224 to the first layer 160 which, in some embodiments, may comprise a chemically inert chemical composition that discourage chemical interaction and adherence.

FIG. 3A and FIG. 3B provide a front views of at least a portion of an assembled protective lens incorporated into a personal protective equipment 300, in accordance with embodiments of the invention. The PPE 300 is depicted in FIG. 3A and FIG. 3B as a full body suit, however, other configurations of garments may be implemented. In the illustrated embodiments, the PPE system 300 may comprise an assembled protective lens 310 coupled to a full body protective suit 320. A seal 330 formed between the assembled protective lens 310 and the full body protective suit 320 may be heat-sealed or the like to provide a substantially air-tight seal between an interior and an exterior of the PPE.

As illustrated in FIG. 3A, the PPE 300 is configured to provide the assembled protective lens 310 positioned and sealed about an aperture defined by the full body protective suit 320 to allow a user of the suit 320 to see through the aperture and the protective lens 310 while still benefiting from the full protective qualities of the PPE 300. In some embodiments, such as the illustrated embodiment, the optically transparent, semitransparent, or translucent layers (i.e., the first, second, and third layers) of the assembled protective lens 310 primarily extend across the aperture of the full body protective suit 320, wherein other components described herein such as the stitches, seams, interfacial material, and seam tape used to operatively couple the assembled protective lens 310 to the full body protective suit 320 are mostly out of a viewing path of the user looking through the aperture and the protective lens, thereby allowing the viewing path of the user to remain substantially unobstructed.

It should be noted that the Figures, such as FIGS. 1A, 1B, 2A, and 2B, are not necessarily depicted to scale and that any space or separation between various layers and/or components of the figures is included to distinctly and clearly present the various layers and/or components of the invention. In some embodiments of the invention, the various layers and/or components of the system are in complete contact with one another wherein there is no space that separates the layers and/or components. In other embodiments, the layers and/or components of the composite system are not within complete contact with one another and at least some space separates the layers.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A protective lens to be attached within an aperture of a composite, the protective lens comprising:
    a first layer comprising a first surface and a second surface, the first layer comprising a substantially non-reactive material, wherein the first layer is sealingly attached to the composite;
    a second layer comprising a first surface and a second surface, the first surface of the second layer being positioned adjacent to the second surface of the first layer, the second layer further comprising a substantially fire-resistant material; and
    a third layer comprising a first surface and a second surface, the first surface of the third layer being positioned adjacent to the second surface of the second layer, wherein the third layer comprises a substantially hydrophobic material,
    wherein the second layer and the third layer are stitched together and wherein the first layer is not stitched to the stitched second and third layers and wherein the first layer at least partially encapsulates the stitched second and third layers to secure the stitched second and third layers between the first layer and the composite.

2. The protective lens of claim 1 wherein the surface area of the second surface of the first layer is greater than the surface area of at least one of the first surface of the second layer and the first surface of the third layer so that the first layer comprises an extension portion around at least a portion of the perimeter of the at least one of the second layer and the third layer.

3. The protective lens of claim 1 further comprising:
    a first interfacial layer positioned on at least a portion of the first surface of the second layer; and
    at least one stitch extending through the first interfacial layer and the second layer.

4. The protective lens of claim 3 further comprising:
    a second interfacial layer positioned on at least a portion of the second surface of the third layer; and
    wherein, the at least one stitch extends through the first interfacial layer, the second layer, the third layer, and the second interfacial layer.

5. The protective lens of claim 1, wherein the substantially non-reactive material of the first layer comprises a fluorinated polymer.

6. The protective lens of claim 5, wherein the fluorinated polymer is fluorinated ethylene propylene.

7. The protective lens of claim 1, wherein the fire-resistant material of the second layer comprises a chlorinated polymer.

8. The protective lens of claim 7, wherein the chlorinated polymer comprises polyvinylchloride.

9. The protective lens of claim 1, wherein the second layer is substantially fire retardant.

10. The protective lens of claim 1, wherein the substantially hydrophobic material of the third layer comprises polyethylene terephthalate.

11. The protective lens of claim 1, wherein the third layer comprises a film.

12. The protective lens of claim 1, wherein the third layer comprises a coating.

13. The protective lens of claim 1, wherein the flexural rigidity of one of the first layer, the second layer, and the third layer is higher compared to the flexural rigidity compared to the other two layers.

14. The protective lens of claim 1, wherein the flexural rigidity of the second layer is higher compared to the flexural rigidity of the other two layers.

15. A protective article comprising:
    a garment comprising a first surface and a second surface and defining an aperture having a perimeter; and
    a protective lens coupled to the first surface and second surface of the garment about the perimeter of the aperture, the lens comprising:
        a first layer comprising a first surface and a second surface, the first layer comprising a substantially non-reactive material, wherein the first layer is sealingly attached to the garment;
        a second layer comprising a first surface and a second surface, the first surface of the second layer being positioned adjacent to the second surface of first layer, the second layer further comprising a substantially fire-resistant material; and
        a third layer comprising a first surface and a second surface, the first surface of the third layer being positioned adjacent to the second surface of the second layer, wherein the third layer comprises a substantially hydrophobic material,
    wherein the second layer and the third layer are stitched together and wherein the first layer is not stitched to the stitched second and third layers and wherein the first layer at least partially encapsulates the stitched second and third layers to secure the stitched second and third layers between the first layer and the garment.

16. The protective article of claim 15, wherein the surface area of the second surface of the first layer is greater than the surface area of at least one of the first surface of the second layer and the first surface of the third layer so that the first layer comprises an extension portion around at least a portion of the perimeter of the at least one of the second layer and the third layer.

17. The protective article of claim 15 further comprising:
a first interfacial layer positioned on at least a portion of the first surface of the second layer; and
at least one stitch extending through the first interfacial layer and the second layer.

18. The protective article of claim 17 further comprising:
a second interfacial layer positioned on at least a portion of the second surface of the third layer; and
wherein, the at least one stitch extends through the first interfacial layer, the second layer, the third layer, and the second interfacial layer.

19. The protective article of claim 15 further comprising:
a first seam tape, the first seam tape overlapping an edge of the first surface of the first layer and the first surface of the garment about the perimeter of the aperture of the garment;
a second seam tape, the second seam tape overlapping an edge of the second surface of the third layer and the second surface of the garment about the perimeter of the aperture of the garment; and
wherein the first seam tape and the second seam tape at least partially couple the protective lens to the garment.

20. The protective article of claim 15, wherein the substantially non-reactive material of the first layer comprises a fluorinated polymer.

21. The protective article of claim 20, wherein the fluorinated polymer is fluorinated ethylene propylene.

22. The protective article of claim 15, wherein the fire-resistant material of the second layer comprises a chlorinated polymer.

23. The protective article of claim 22, wherein the chlorinated polymer comprises polyvinylchloride.

24. The protective article of claim 15, wherein the second layer is substantially fire retardant.

25. The protective article of claim 15, wherein the substantially hydrophobic material of the third layer comprises polyethylene terephthalate.

26. The protective article of claim 15, wherein the third layer comprises a film.

27. The protective article of claim 15, wherein the third layer comprises a coating.

28. The protective article of claim 15, wherein the flexural rigidity of one of the first layer, the second layer, and the third layer is higher compared to the flexural rigidity compared to the other two layers.

29. The protective article of claim 15, wherein the flexural rigidity of the second layer is higher compared to the flexural rigidity of the other two layers.

30. A method of constructing a protective article, the method comprising:
providing a first layer having a first surface and a second surface and comprising a substantially non-reactive material, a second layer having a first surface and a second surface and comprising a substantially fire-resistant material, and a third layer having a first surface and a second surface and comprising a substantially hydrophobic material;
positioning the first surface of the second layer adjacent to the second surface of the first layer;
positioning the first surface of the third layer adjacent to the second surface of the second layer;
providing a garment having an aperture, the aperture defining a perimeter; and
coupling the first, second and third layers together and to the garment about the perimeter of the garment, wherein said coupling step comprises stitching the second layer and the third layer together without stitching the first layer to the stitched second and third layers and wherein the first layer at least partially encapsulates the stitched second and third layers to secure the stitched second and third layers between the first layer and the garment.

31. The method of claim 30, wherein the coupling step comprises:
providing a first interfacial layer;
positioning the first interfacial layer on at least a portion of the first surface of the second layer; and
stitching through the first interfacial layer and the second layer with at least one stitch.

32. The method of claim 31, wherein the coupling step comprises:
providing a second interfacial layer;
positioning the second interfacial layer on at least a portion of the second surface of the third layer; and
stitching through the first interfacial layer, the second layer, the third layer, and the second interfacial layer with at least one stitch.

33. The method of claim 30, wherein the coupling step comprises:
providing a first seam tape and a second seam tape;
securing the first seam tape to the first layer and the garment by overlapping an edge of the first surface of the first layer and the first surface of the garment about the perimeter of the aperture of the garment; and
securing the second seam tape to the third layer and the garment by overlapping an edge of the second surface of the third layer and the second surface of the garment about the perimeter of the aperture of the garment.

* * * * *